United States Patent Office 3,124,607
Patented Mar. 10, 1964

3,124,607
ORGANIC CARBONATE ESTERS
Robert M. Schisla, Dayton, Ohio, assignor to Monsanto Chemical Company, St. Louis, Mo., a corporation of Delaware
No Drawing. Filed Nov. 21, 1960, Ser. No. 70,400
4 Claims. (Cl. 260—463)

This invention relates to organic carbonate esters. In one aspect, this invention relates to biscarbonates of 2-chloro-4-nitrophenol. In another aspect, this invention relates to a method for preparing biscarbonates of 2-chloro-4-nitrophenol. In another aspect, this invention relates to biological toxicant compositions containing at least one biscarbonate of 2-chloro-4-nitrophenol, as the essential active ingredient. In another aspect, this invention relates to methods of controlling biological pests by the application of a biological toxicant composition containing a biscarbonate of 2-chloro-4-nitrophenol.

Numerous glycol biscarbonate compounds are known to exist and to have commercial value in a great variety of useful applications. For example, glycol ether bis-(aliphatic carbonate) compounds have been found to be useful as paint thinners, as hydraulic fluids, and as resin plasticizers.

It has now been discovered, according to this invention, that new biscarbonates are formed when glycol bis(chloroformates) are reacted with 2-chloro-4-nitrophenol and that such compounds are useful for controlling biological pests.

An object of this invention is to provide new biscarbonate compounds of 2-chloro-4-nitrophenol. It is another object of this invention to provide a method for reacting 2-chloro-4-nitrophenol with glycol bis(chloroformate). It is another object of this invention to provide biological toxicant compositions containing biscarbonates of 2-chloro-4-nitrophenol as an essential active ingredient. Another object of this invention is to provide methods for controlling biological pests by the application of a biological toxicant composition containing a biscarbonate of 2-chloro-4-nitrophenol.

Other aspects, objects, and advantages of this invention are apparent from a consideration of the accompanying disclosure and the appended claims.

According to the present invention, glycol bis(chloroformates) are reacted with 2-chloro-4-nitrophenol according to the following reaction:

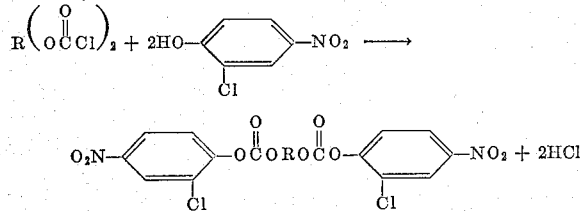

wherein R is a bivalent radical selected from the group consisting of alkylene radicals having from 2 to 4 carbon atoms, -alkylene-oxy-alkylene- radicals having from 2 to 4 carbon atoms in each alkylene group, and polyalkylene-oxy-alkylene radicals having from 3 to 10 alkylene groups and from 2 to 4 carbon atoms in each alkylene group, in the presence of a basic acid acceptor material.

Further, according to the present invention, there are provided as new compounds, bis(2-chloro-4-nitrophenyl carbonate) compounds of the formula

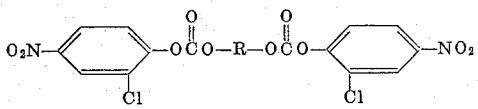

wherein R is as defined above. Simple examples of which are: ethylene glycol bis(2-chloro-4-nitrophenyl carbonate), diethylene glycol bis(pentachlorophenyl carbonate), and triethylene glycol bis(tetrachlorophenyl carbonate).

Further, according to the present invention, there are provided biological toxicant compositions comprising a carrier adjuvant and, as an essential active ingredient, a toxic amount of at least one of the above defined glycol (2-chloro-4-nitrophenyl carbonate) compounds.

Further, according to the present invention, there are provided methods for controlling biological pests by the application of said above-defined biological toxicant compositions.

The chloroformate glycol derivatives employed in the reaction of this invention can be prepared by the reaction of phosgene with alkylene glycol, alkylene-oxy-alkylene glycol, or a polyalkylene-oxy-alkylene glycol wherein the alkylene groups have from 2 to 4 carbon atoms and the number of alkylene groups in the glycol is from 3 to about 10. Such alkylene glycol dichloroformate compounds are conventionally prepared by adding phosgene to a cooled, stirred solution of the glycol at a temperature usually around 0° C. and stirring the mixture until the reaction is complete. The di(chloroformate) product may then be washed with water and dried over a dehydrating agent. Examples of such alkylene glycol dichloroformate reactants are: ethylene glycol bis(chloroformate), propylene glycol bis(chloroformate), butylene glycol bis(chloroformate), diethylene glycol bis(chloroformate), dipropylene glycol bis(chloroformate), dibutylene glycol bis(chloroformate), alkylene-oxy-alkylene bis(chloroformates) such as: triethylene glycol bis(chloroformate), tripropylene glycol bis(chloroformate), tributylene glycol bis(chloroformate), tetrapropylene glycol bis(chloroformate), pentaethylene glycol bis(chloroformate), pentabutylene bis(chloroformate), hexaethylene glycol bis(chloroformate), hexabutylene glycol bis(chloroformate), and higher derivates such as heptaethylene glycol bis(chloroformate), nonapropylene glycol bis(chloroformate), and decaethylene glycol bis(chloroformate).

Reaction of the alkylene bis(chloroformate) compounds is generally exothermic with the 2-chloro-4-nitrophenol so that this reaction is normally conducted in an inert solvent medium under carefully controlled temperature conditions. In general, a temperature within the range of from −10 to 50° C. is used and preferably the temperature is maintained within the range of from 0 to 20° C. The solvent used should be one in which the alkylene bis(chloroformate) compound is soluble, and is preferably one which also functions as a basic acid acceptor substance such as dimethyl aniline and pyridine. However, other solvents, such as benzene, toluene, hexane and the like can be used if a stoichiometric amount of the acid acceptor substance is also present.

The reaction of this invention is normally conducted by either dissolving or suspending the 2-chloro-4-nitrophenol in a suitable solvent, and adding the glycol bis(chloroformate) compound slowly under constant agitation and carefully controlled temperature conditions involving removing the exothermic heat of reaction. The completion of the reaction can be readily determined by observing the temperature of the reaction mixture and noting the cessation of a slight temperature rise upon continued addition of bis(chloroformate) or by noting the amount of by-product, base hydrochloride produced. When the required amount of the alkylene bis(chloroformate) compound has been added, the mixture is allowed to set several hours, suitably overnight, with stirring, after which the solvent is removed using a water aspirator with mild heating, that is at about 25–40° C. The product remaining as residue may be purified if desired, for example, by washing with concentrated sodium hydroxide and then with ether. The product is soluble in ether and the sodium hydroxide functions to wash away any excess hydrogen chloride. When the product is solid, it may be readily filtered, and washed several times with ether and cold water and then dried, as for example, in a vacuum oven. Where the product is non-solid, that is, a viscid fluid mass, ether is vacuumed off and the product is heated to remove undesirables such as low boiling carbonates, unreacted materials and any remaining solvent.

Examples of the alkylene bis(2-chloro-4-nitrophenyl carbonate) compounds obtained as products using the alkylene bis(chloroformate) reactants are as follows: ethylene glycol bis(2-chloro-4-nitrophenyl carbonate), propylene glycol bis(2-chloro-4-nitrophenyl carbonate), butylene glycol bis(2-chloro-4-nitrophenylcarbonate), and 1,4-butylene glycol bis(2-chloro-4-nitrophenyl carbonate).

Illustrative examples of alkylene-oxy-alkylene bis(2-chloro-4-nitrophenyl carbonate) compounds obtained as products of the reaction using alkylene-oxy-alkylene bis (chloroformate) compounds for example, diethylene glycol bis(chloroformate) reactants are as follows: diethylene glycol bis(2-chloro-4-nitrophenyl carbonate), dipropylene glycol bis(2-chloro-4-nitrophenyl carbonate), and dibutylene glycol bis(2-chloro-4-nitrophenyl carbonate).

Similarly, when polyalkylene-oxy-alkylene glycol bis (chloroformates) are reacted with 2-chloro-4-nitrophenol, the respective polyalkylene-oxy-alkylene glycol bis(2-chloro-4-nitrophenyl carbonate) compound is formed, specific examples of which are: triethylene glycol bis(2-chloro-4-nitrophenyl carbonate), tripropylene glycol bis(2-chloro-4-nitrophenyl carbonate), tributylene glycol bis(2-chloro-4-nitrophenyl carbonate), tetraethylene glycol bis(2-chloro-4-nitrophenyl carbonate, tetrabutylene glycol bis (2-chloro-4-nitrophenyl carbonate), pentapropylene glycol bis (2-chloro-4-nitrophenyl carbonate), and octaethylene glycol bis (2 - chloro - 4 - nitrophenyl carbonate). In general, all of these compounds show biological activity to varying extents and for various purposes. In addition, these compounds can also be advantageously employed as plasticizers for many plastics and resins, and as lubricants and lubricant additives.

The advantages, desirability and usefulness of the new compounds of this invention are illustrated by the following examples.

Example 1

To a solution of 69.2 g. (0.4 mole) of 2-chloro-4-nitrophenol in 600 ml. of pyridine, cooled in an ice bath to keep the temperature below 20° C. there was slowly added, while stirring, 37.4 g. (0.2 mole) of ethylene glycol bis (chloroformate). The mixture was stirred for 18 hours and then pyridine solvent was removed under aspirator vacuum at 25 to 40° C. The residue was extracted with excess ether and washed with 1.5 N sodium hydroxide to remove any unreacted 2-chloro-4-nitrophenol and with 3 N hydrochloric acid to remove any remaining pyridine. The ether solution was then dried and distilled to remove excess ether. A precipitate of 50.5 g. of ethylene glycol bis(2-chloro-4-nitrophenyl carbonate), M.P. 144–145° C., was obtained. Upon analysis of the product, there was found 6.16% nitrogen and 14.70% chlorine as compared to 6.07% nitrogen and 15.37% chlorine, the calculated values.

Example 2

A solution of 69.2 g. (0.4 mole) of 2-chloro-4-nitrophenol in 600 ml. of pyridine was reacted with 54.0 g. (0.234 mole) of diethylene glycol bis(chloroformate) while controlling the temperature below 20° C. during the addition of the dichloroformate reactant. The reaction mixture was stirred for 18 hours and then was heated to remove the pyridine solvent. The residue was washed with sodium hydroxide and with hydrochloric acid after dissolving the residue in ether as in Example 1. However, the desired product was practically soluble in ether and was easily collected by evaporation of the dried ether solutions after the ether solutions were washed several times with 500 ml. portions of 1.5 N sodium hydroxide and 1.5 N hydrochloric acid. After separating the aqueous from the ether layers the ether solvent was removed by filtration and the residue was dried in a vacuum oven. There was obtained 59.7 g. of diethylene glycol bis(2-chloro-4-nitrophenyl carbonate, M.P. 83–84° C., which upon analysis analyzed as containing 14.01% chlorine and 5.60% nitrogen as compared to 14.03% chlorine and 5.54% nitrogen, the calculated values.

Example 3

In this example, ethylene glycol bis(2-chloro-4-nitrophenyl carbonate) was evaluated as a soil fungicide against soil borne pathogens. One pound of soil infested with damping-off fungi, *Rhizoctonia solani*, *Sclerotium rolfsii*, *Fusarium lycopersici*, *Verticillium albo-atrum*, and *Pythium* sp. was placed in a Mason jar and a 5 ml. portion of a 1% acetone solution of the candidate chemical added to give an application rate of 100 p.p.m. The jar was then sealed and the contents thoroughly mixed by vigorous shaking. The treated soil was incubated at room temperature for 24 hours and then transferred to 4 inch clay pots within which were planted 5 seeds of each cotton and cucumber. The seeded pots were incubated at 70° F. and 98% relative humidity for 24 hours. The pots were then transferred to a greenhouse where disease arrangements were made 10 to 14 days later. At the end of this time, it was found that 18 to 20 out of a possible 20 plants were growing in the pot which had been treated with ethylene glycol bis(2-chloro-4-nitrophenyl carbonate).

Example 4

In this example, the procedure of Example 3 was repeated wherein diethylene glycol bis(2-chloro-4-nitrophenyl carbonate) was tested as a soil fungicide. At the end of the stated incubation time, it was found that 15 to 17 out of a possible 20 plants were growing in the pot which had been treated with diethylene glycol bis(2-chloro-4-nitrophenyl carbonate).

Example 5

In this example, ethylene glycol bis(2-chloro-4-nitrophenyl carbonate) and diethylene glycol bis(2-chloro-4-nitrophenyl carbonate) were tested against *Staphylococcus aureus* and *Salmonella typhosa*. A 1% stock solution of the compound in a non-toxic solvent was added to nutrient agar to give test samples containing 1 part of the compound per 10,000 parts of the agar. Petri dishes were filled with the test mixtures and the plates thus prepared were then respectively inoculated with said *Staphylococcus aureus* and said *Salmonella typhosa* organisms and incubated for two days at a temperature of 37° C. At the end of that time, inspection of the plates showed complete inhibition of growth of both organisms, while plates not containing said compound, but otherwise identical and incubated similarly, showed normal uninhibited growth.

Further testing of the compound ethylene glycol bis(2-chloro-4-nitrophenyl carbonate) at 1 part of the compound per 10,000 parts of the agar against the same organisms, incubated in the same way and at the same temperature, showed complete inhibition of the growth of both organisms, while plates not containing the said compound, but otherwise identical and incubated similarly showed normal uninhibited growth. Similarly, the compound diethylene glycol bis(2-chloro-4-nitrophenyl carbonate) tested at 1 part of the compound per 10,000 parts of the agar inhibited the growth of *Staphylococcus aureus*, while plates not containing the said compound, but otherwise incubated similarly showed normal uninhibited growth.

Example 6

In this example, ethylene glycol bis(2-chloro-4-nitrophenyl carbonate) and diethylene glycol bis(2-chloro-4-nitrophenyl carbonate) were tested against the fungus *Aspergillus niger* employing the following test procedure. A 1% stock solution of the compound in a non-toxic solvent was made up and this solution was added to sterile, melted dextrose agar in a quantity to give 1 part of the compound per 1000 parts of agar. After thorough mixing, the agar was poured into Petri dishes and allowed to harden. One drop of a spore suspension of the fungus was applied as inoculant for each plate. The inoculated plates were incubated at a temperature of 25° C. for 5 days. At the end of that time, inspection of the dishes showed complete inhibition of growth of the test fungus, while plates not containing one of the test compounds but otherwise identical and incubated similarly showed normal uninhibited growth.

The pesticidal compositions of this invention can be either liquids or dusts containing the new compounds of this invention admixed with suitable liquid or finely divided solid adjuvant carriers. These liquid and dust compositions can also contain, in addition to the regular adjuvants, other additaments, such as fertilizers, for particular applications.

Liquid compositions containing the desired amount of these novel carbonate compounds can be prepared by dissolving them in an organic solvent, such as dioxane, diethyl carbitol, or tetrahydrofuran. Although these carbonate compound toxicants are substantially insoluble in water, liquid compositions can be made by dispersing a finely divided carbonate in water using a suitable dispersing agent. Also, if desired, liquid compositions can be formed by dispersing the organic liquid composition containing the dissolved carbonate compound in water solutions to form an emulsion with the aid of a suitable dispersing and emulsifying agent. Dispersing agents employed in these compositions are oil soluble and include non-ionic emulsifiers such as the condensation products of alkylene oxide with phenols and organic acids, polyoxyethylene derivatives of sorbitan esters, complexed ether alcohols and the like. Ordinarily, the concentration of the carbonate toxicant in the liquid composition will comprise from 1–95% by weight of the total composition.

In dust compositions, the carbonate toxicant is dispersed in finely-divided solid materials such as talc, chalk, gypsum, fuller's earth, clay and the like. The concentration of the carbonate toxicant in the dust composition can vary over wide ranges and preferably comprises from 5 to 95% by weight of the total composition.

The pesticidal compositions of this invention are applied to the situs of the pest in the conventional manner well known to those skilled in the art. Thus, where the compositions are to be applied to the foliage of growing plants, dust or liquid compositions are applied by the use of power dusters, hand sprayers, and spray dusters. The exact dosage of toxicant to be applied depends to a substantial extent upon the nature of the pest to be controlled and their environment. Suitable dosages can be readily determined by those skilled in the art from the examples given herein.

Reasonable variation and modification of the invention as described are possible, the essence of which is that there have been provided (1) biscarbonates of 2-chloro-4-nitrophenol as new compounds, (2) methods for preparing said compounds by reaction of a glycol bis(chloroformate) compound with 2-chloro-4-nitrophenol in an appropriate solvent, (3) biological toxicant compositions containing at least one of said compounds as the essential active ingredient, and (4) methods for controlling biological pests by the application of said biological toxicant compositions.

I claim:

1. A compound of the formula

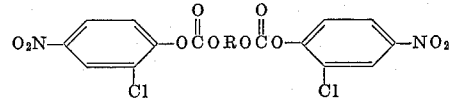

wherein R is a bivalent radical selected from the group consisting of alkylene radicals having from 2 to 4 carbon atoms, -alkylene-oxy-alkylene- radicals having from 2 to 4 carbon atoms in each alkylene group, and polyalkylene-oxy-alkylene radicals having from 3 to 10 alkylene groups and from 2 to 4 carbon atoms in each alkylene group.

2. A compound according to the formula of claim 1 wherein R is an alkylene radical having from 2 to 4 carbon atoms.

3. A compound having the formula

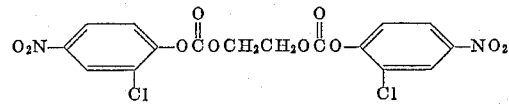

4. A compound having the formula

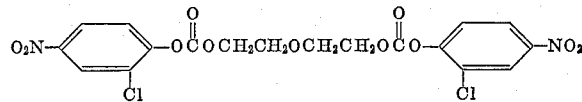

References Cited in the file of this patent

UNITED STATES PATENTS

| | | |
|---|---|---|
| 2,370,571 | Muskat et al. | Feb. 27, 1945 |
| 2,384,143 | Strain et al. | Sept. 4, 1945 |
| 2,711,997 | Trieschmann et al. | June 28, 1955 |
| 2,789,968 | Reynolds et al. | Apr. 23, 1957 |
| 2,821,539 | Newman et al. | Jan. 28, 1958 |
| 2,873,291 | Spiegler | Feb. 10, 1959 |
| 2,992,159 | Kahn et al. | July 11, 1961 |
| 2,992,966 | Jacobi et al. | July 18, 1961 |